(12) United States Patent
Bobak

(10) Patent No.: US 8,843,665 B2
(45) Date of Patent: Sep. 23, 2014

(54) OPERATING SYSTEM STATE COMMUNICATION

(75) Inventor: Roman A. Bobak, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 13/352,997

(22) Filed: Jan. 18, 2012

(65) Prior Publication Data

US 2013/0185460 A1    Jul. 18, 2013

(51) Int. Cl.
  *G06F 3/00* (2006.01)

(52) U.S. Cl.
  USPC .................................. 710/15; 710/17; 710/19

(58) Field of Classification Search
  None
  See application file for complete search history.

(56) References Cited

U.S. PATENT DOCUMENTS

| | | | |
|---|---|---|---|
| 7,707,586 B2 * | 4/2010 | Smith et al. | 719/317 |
| 2003/0229406 A1 * | 12/2003 | Maity | 700/27 |
| 2006/0143344 A1 * | 6/2006 | Lindsay et al. | 710/105 |
| 2007/0050666 A1 * | 3/2007 | Hsieh et al. | 714/6 |
| 2008/0148390 A1 | 6/2008 | Zimmer et al. | |
| 2009/0235048 A1 * | 9/2009 | Mitsubayashi et al. | 712/29 |
| 2010/0250735 A1 | 9/2010 | Andersen | |

* cited by examiner

*Primary Examiner* — Idriss N Alrobaye
*Assistant Examiner* — David Martinez
(74) *Attorney, Agent, or Firm* — Cantor Colburn LLP; William A. Kinnaman, Jr.

(57) ABSTRACT

A service processor communication method includes establishing a communication channel between a service processor and a central processor in a computing system, wherein communication on the communication channel is independent of processing by the central processor, monitoring an operating system that is under control by the central processor, defining a source designator associated with state information of the operating system, and that is passed via the communication channel between the service processor and the central processor; and announcing the state information to a resource external to the computing system.

20 Claims, 2 Drawing Sheets

OPERATING SYSTEM STATE COMMUNICATION

BACKGROUND

The present invention relates to computing system state communication and, more specifically, to systems and methods for externally communicating a state of a computing system when the computing system is in a low functioning state.

There are several circumstances in which a computing system is unable to communicate to external resources. The operating system (OS) may be barely functional because it is failing or beginning to initialize. Failures can include, but are not limited to, a communications software failure, a recovery operation that prevents preemption, a full communication stack that cannot queue more, the OS is crashing or shutting down for a variety of reasons. In addition the underlying hardware of the system can experience failures in both hardware and embedded software. Failures can include, but are not limited to, a failure of hardware or the input/output subsystem.

System automation monitors a platform running applications. System automation is responsible to keep those applications running even in the case of underlying failures. Automation systems require that various processors, such as a service processor and various other distributed processors, and the OS be able to communicate their state even when they are not online and available. Without this information automation system applications do not have accurate information of the state of the processor and the OS and can make decisions that may be incorrect.

SUMMARY

Exemplary embodiments include a service processor communication method, including establishing a communication channel between a service processor and a central processor in a computing system, wherein communication on the communication channel is independent of processing by the central processor, monitoring an operating system that is under control by the central processor, defining a source designator associated with state information of the operating system, and that is passed via the communication channel between the service processor and the central processor; and announcing the state information to a resource external to the computing system.

Additional exemplary embodiments include a computer program product including a non-transitory computer readable medium storing instructions for causing a computer to implement a service processor communication method. The method includes establishing a communication channel between a service processor and a central processor in a computing system, wherein communication on the communication channel is independent of processing by the central processor, monitoring an operating system that is under control by the central processor, defining a source designator associated with state information of the operating system, and that is passed via the communication channel between the service processor and the central processor; and announcing the state information to a resource external to the computing system.

Further exemplary embodiments include a computing system, including a central processor, an operating system under the control of the central processor and a service processor communicatively coupled to the central processor via a communication channel, and in communication with the operating system, wherein the service processor is configured to externally communicate a state of the operating system independent of the central processor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein enable an OS that is not functioning properly to still externally communicate their state to those processors and application that need to know the state of the OS, hardware or underlying applications. The systems and methods described herein use a distributed processor system as an example. In the examples, the distributed processors include a service processor that is responsible for managing and booting the other processors. For example, in an IBM z/Architecture system a central processor issues several instructions for diagnosis and service from the service processors which may reside with the service processor in the same machine or reside externally to other processors in other machines. It is appreciated that the systems and methods described herein can be implemented in any type of processor or machine that can be used to communicate and service a failing or initializing OS. For example, the systems and methods described herein can be implemented in any system with one or more central processors sharing commonly addressable storage and input/output devices under the control of an operating system software. The system is used to process applications and other user tasks.

The exemplary systems and methods described herein enable an OS to implement a channel to announce its state when the OS would not normally be able make the announcement. Such reasons the OS is not able to make its own announcement include but are not limited to: when the OS is beginning initialization (i.e., Initial Program Load or boot or power-on); in a recovery operation when input/output using its own communication channel is not allowed for reasons such as disablement for resource serialization; input/output device failure; input/output subsystem failure; the OS is in failure due to such things as power off, fatal software error, power/thermal/other failures; going into standby state such as hibernation; becoming a hot spare; waiting for work; and other undesignated reasons.

Figure 1:
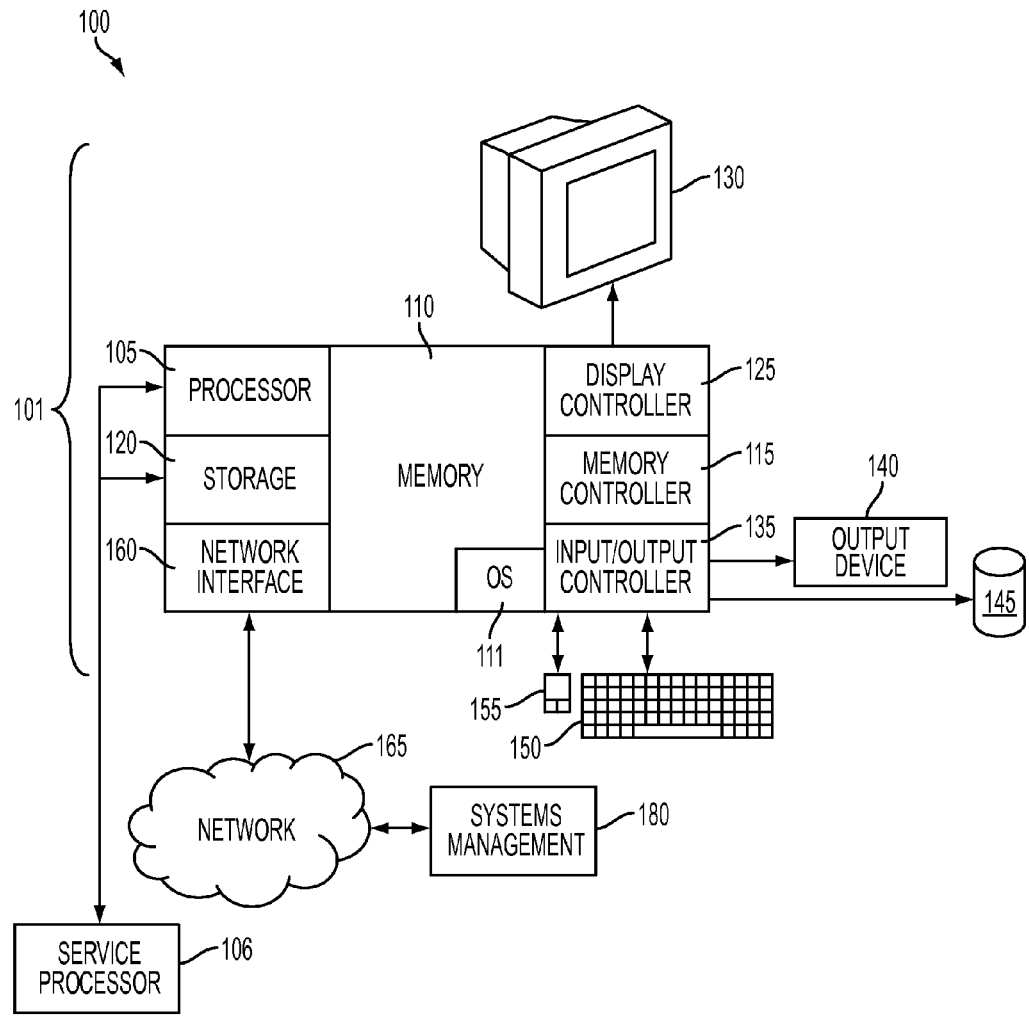
FIG. 1 illustrates an exemplary embodiment of a system for externally communicating OS states.

FIG. 1 illustrates an exemplary embodiment of a system 100 for externally communicating OS states. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a central processor 105, memory 110 coupled to a memory controller 115, and one or more input and/or output (I/O) devices 140, 145 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

In exemplary embodiments, the system 100 further includes a service processor 106, coupled to the central processor 105. As described herein, the service processor 106 is configured to initialize and service other processors such as the central processor 105. As described herein, the service processor 106 can be part of the same machine as the central processor 105 (e.g., the computer 101) or may reside on a different machine.

The service processor 106 enables the remote monitoring and management of the computer 101. It has a completely separate status from the central processor 105, the OS 111 and any applications that might be running in the memory 110 and can be connected to a separate network (e.g., a network 165 described further herein). As such, the service processor 106 is configured to determine the status of the central processor 105 and the OS and can communicate that status external to the computer 101, such as to the network 165. The service processor 106 can also perform several functions including, but not limited to: environmental monitoring and automated shutdown in the event of an out-of-bounds condition, such as a the central processor 105 overheating, reconfiguring the central processor 105 or the input/output devices 140, 145 (e.g., via the input/output controller 135); assigning multiple input/output paths (e.g., via the input/output controller 135); monitoring environmental statistics, such as the temperatures, currents, and voltages present in the computer 101; monitoring and controlling power flow to components within the computer 101; performing power-on self-tests and computer diagnostics; logging and notifying events within the computer 101. The service processor 106 therefore monitors the health of the computer 101 and supports a graceful shutdown if a failure is probable.

In exemplary embodiments, the service processor 106 operates as a direct surrogate of the OS 111, in circumstances in which the OS 111 is unable to communicate externally such as to the network 165. In exemplary embodiments, the service processor 106 includes basic responsibilities such as but not limited to monitoring the OS 111, detecting problems with the OS 111 (e.g., a power failure, a hang-up, recovery operation or initialization), and taking action to address the problem. In addition, the service processor 106, as the surrogate for the OS 111, can directly communicate the state of the OS 111 external to the computer 101. In exemplary embodiments, the service processor can include a direct channel external to the computer 101 (e.g., to the network 165). It can be appreciated that the state of the OS 111 can be hidden. As the surrogate for the OS 111, the service processor 106 can identify and communicate the state.

The direct communication between the OS 111 and the service processor 106 includes information about the operational state of the OS 111, hardware attached to the central processor 105, or software running on the OS 111. The service processor 106 can also communicate an anticipated next state of the OS 111, with a projected time to that state. The service processor 106 decides about whether to transfer work to another machine or system, to wait for recovery, or other decision because the service processor 106 has direct knowledge of the OS 111, which can be hidden. As such the OS 111 can announce that it is initializing, for example, even though it may be a finite period of time before the OS 111 is a state where it is capable of announcing that the OS 111 is up and running.

In exemplary embodiments, the service processor 106 can also communicate source information for state announcements. The source can be a speculation by the service processor 106 because the service processor 106 detected an extended period when the OS 111 was nonresponsive. The speculation by the service processor 106 can be flagged as a "best guess" as to the source of the problem. State information being passed along by the service processor 106 on behalf of the OS 111 can be marked as being sourced from the OS 111 and would be considered much more reliable than the guess from the service processor 106. It can therefore be appreciated that as a direct surrogate, the service processor 106 communicates on behalf of the OS 111 and as if the OS 111 is communicating itself, although it is in fact unable to communicate. The OS 111 could indicate it is not operational and will not recover for events such as a hardware failure, that it is not operational and its ability to recover is unknown or that it believes recovery is possible and projected time to operations is some finite period of time.

In exemplary embodiments, the OS 111 can issue a special machine instruction, write to a specific memory address or otherwise pass information to the service processor 106. For example, in z/Architecture, the special instruction can be a Service Call instruction or a Diagnose instruction. Regardless of the implementation, the special instruction is that it is a "fire and forget" type instruction, which needs no additional processing by the central processor 105 or the OS 111 to complete its operation. The information could reside in registers, storage, or a stack depending on the particular machine architecture. For example, in z/Architecture, the information would be passed in registers or storage depending on the amount of data to pass. Upon receiving the signal from the OS 111, the service processor 106 is responsible for announcing the state information from the OS 111 to the systems management system 180, using its independent (from the OS 111) communication stack (a.k.a. network protocol stack or simply protocol stack). The state information would contain a current operational state, anticipated next state, estimated time to next state, a source designator for the announcement (i.e., service processor 106, OS 111 announcing its own state, or an OS announcing the state of another OS), confidence of the announcement state, next state and transition time. In exemplary embodiments, the OS 111, under the control of the central processor 105, defines a source designator associated along with state information of the OS 111, hardware and/or applications and that is passed via the communication channel between the central processor 105 and the service processor 106, and announcing the state information to a source external to the computer 101.

The central processor 105 and the service processor 106 are hardware devices for executing software, particularly that stored in memory 110. The central processor 105 the service processor 106 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the central processor 105 and the service processor 106.

The software in memory 110 may include one or more separate programs, each of which comprises an ordered listing of executable instructions for implementing logical functions. In the example of FIG. 1, the software in the memory 110 includes the OS state communication methods described herein in accordance with exemplary embodiments and a suitable OS 111. The OS 111 essentially controls the execution of other computer programs, such the OS state communication systems and methods as described herein, and provides scheduling, input-output control, file and data management, memory management, and communication control and related services.

The OS state communication methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the OS state communication methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the central processor 105 is configured to execute software stored within the memory 110, to communicate data to and from the memory 110, and to generally control operations of the computer 101 pursuant to the software. The OS state communication methods described herein and the OS 111, in whole or in part, but typically the latter, are read by the central processor 105, perhaps buffered within the central processor 105, and then executed. The service processor 106 can also access programs residing within the memory, for example, to communicate the state of the central processor 105 and OS 111. As described herein, the service processor 106 also initializes the central processor 105 when the computer 101 is not in operation.

When the systems and methods described herein are implemented in software, as is shown in FIG. 1, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the OS state communication methods are implemented in hardware, the OS state communication methods described herein can implemented with any or a combination of the following technologies, which are each well known in the art: a discrete logic circuit (s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, the systems and methods described herein can also be implemented for not only physical processors, such as the central processor 105, but also for virtual processors. Computing systems can implement virtualization technology in which virtual processors simulate the existence of a dedicated real machine, including processor functions, data storage, and input/output resources. In virtualization technology, the central processor 105 and the OS 111 need to both be continuously available for status inquiries and updates for automated system applications. As such, the systems and methods described herein implement the service processor 106 to constantly monitor and communicate the status of the central processor 105 and OS 11.

In exemplary embodiments, the systems and methods described herein the service processor 106 can be a physical processor or a virtual processor. The physical or virtual service processor 106 can be implemented as a surrogate for any processor such as the central processor 105, or OS images that may share physical processors, or be under the control of the service processor 106. As described herein the service processor 106 could be part of a separate machine. In the example described herein, it is part of the computer 101. The OS 111 therefore includes suitable communications mechanisms to handle queries about physical hardware, logical hardware or operating system images from a system managing these resources. The communication mechanism in the OS 111 such that any resource may provide a status that is available to the service processor 106. The communication mechanism can therefore include but is not limited to a definition of new instructions that a resource executes to provide or update the resource status to the service processor 106, or updates to storage (e.g., the storage 120) that is visible to the service processor 106. As such, the systems and methods described herein, enable an operating system image, via the service processor 106, to provide a "dead", "starting", "in recovery", or other status even though its ability to communicate to a systems automation manager is non-existent.

In exemplary embodiments, the service processor 106 enables access to the computer 101 regardless of the status of the computer 101. As such, the service processor is utilized to provide complete out-of-band access to the computer 101 independent of the status of the OS 111. In exemplary embodiments, the out-of-band access is a separate access path to the service processor 106, for example, via the network 165. The out-of-band access of the service processor 106, independent of the OS 111 and other hardware enables the service processor 106 to make guesses about the state of the computer 101. For example, if the computer 101 appears to be non-operational, the service processor 106 broadcasts to an appropriate systems manager that the computer 101 has failed. The system management system can then force a takeover of the failed computer's workload by some other working computer. The takeover operation takes some finite period of time, during which the computer 101 may come back to life and be fully functional. If the computer 101 is simply in a recovery operation, instead of performing a forced takeover, the service processor 106 can broadcast the fact that the computer is in a recovery operation and that there is no need to perform a takeover.

Figure 2:
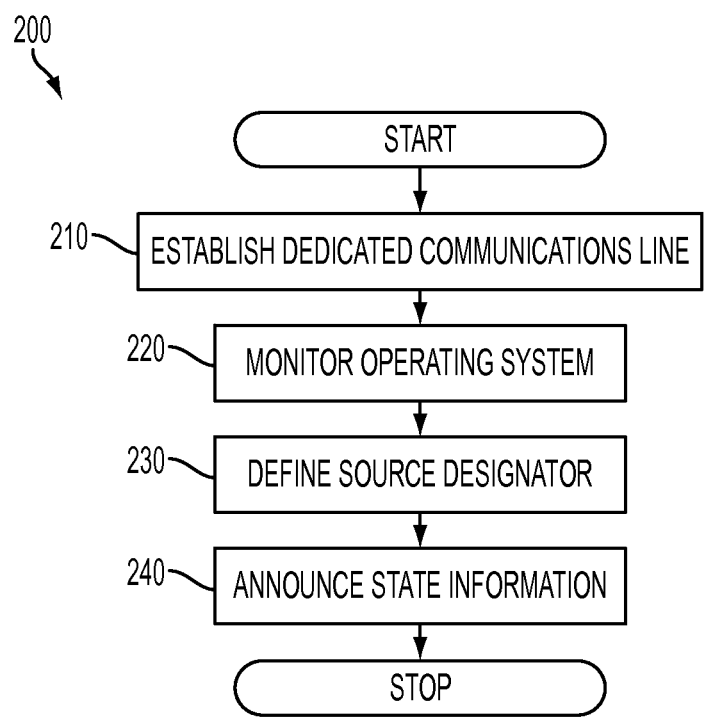
FIG. 2 illustrates a flow chart for a method of externally communicating a status of an OS in accordance with exemplary embodiments.

FIG. 2 illustrates a flow chart for a method 200 of externally communicating a status of an OS in accordance with exemplary embodiments. At block 210, the central processor 105 and the service processor 106 establish a dedicated communication line, wherein communication on the dedicated communication line is independent of processing by the central processor 105. At block 220, the service processor 106 monitors the OS 111. As described herein, the service processor 106 is configured to detect various states of the OS 111. At block 230, the computer 101 defines a source designator associated with state information of the OS 111. The source designator is passed via the communication line between the central processor 105 and the service processor 106. At block 240, the service processor 106 announces the state information of the OS 111 to a source that is external to the computer 101. As described herein, the state information is announced for a variety of reasons such as the initialization of the OS 111 and a failure of the OS 111.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A service processor communication method, comprising:
    establishing a communication channel between a service processor and a central processor in a computing system, wherein communication on the communication channel is independent of processing by the central processor;
    monitoring an operating system, having state information, the operating system being executed by the central processor;
    defining a source designator that is passed via the communication channel between the service processor and the central processor, the communication channeling enabling the service processor to announce a state of the operating system when the central processor is unable to announce the state of the operating system; and
    announcing the state information to a resource external to the computing system.

2. The method as claimed in claim 1 wherein the communication channel is established via at least one of registers in the computing system, storage in the computing system, and stack frames in the computing system.

3. The method as claimed in claim 1 wherein announcing the state information is through at least one of a broadcast and a direct signal to an external designated systems management system.

4. The method as claimed in claim 1 wherein the operating system communicates the state information externally via the service processor.

5. The method as claimed in claim 4 wherein the state information is communicated by the service processor as if the information is communicated by the operating system.

6. The method as claimed in claim 1 wherein the state information includes at least one of a current operational state of the operating system, an anticipated next state of the operating system, estimated time to a next state of the operating system, a source designator for an announcement of the state information, a confidence of the state information, a confidence of the next state of the operating system and a confidence of the estimated time to the next state of the operating system.

7. The method as claimed in claim 1 wherein the source designator designates at least one of the service processor and the operating system announcing the state of the operating system.

8. A computer program product including a non-transitory computer readable medium storing instructions for causing a computer to implement a service processor communication method, the method comprising:
    establishing a communication channel between a service processor and a central processor in a computing system, wherein communication on the communication channel is independent of processing by the central processor;
    monitoring an operating system, having state information, the operating system being executed by the central processor;

defining a source designator that is passed via the communication channel between the service processor and the central processor, the communication channeling enabling the service processor to announce a state of the operating system when the central processor is unable to announce the state of the operating system; and announcing the state information to a resource external to the computing system.

9. The computer program product as claimed in claim 8 wherein the communication channel is established via at least one of registers in the computing system, storage in the computing system, and stack frames in the computing system.

10. The computer program product as claimed in claim 8 wherein announcing the state information is through at least one of a broadcast and a direct signal to an external designated systems management system.

11. The computer program product as claimed in claim 8 wherein the operating system communicates the state information externally via the service processor.

12. The computer program product as claimed in claim 11 wherein the state information is communicated by the service processor as if the information is communicated by the operating system.

13. The computer program product as claimed in claim 8 wherein the state information includes at least one of a current operational state of the operating system, an anticipated next state of the operating system, estimated time to a next state of the operating system, a source designator for an announcement of the state information, a confidence of the state information, a confidence of the next state of the operating system and a confidence of the estimated time to the next state of the operating system.

14. The computer program product as claimed in claim 8 wherein the source designator designates at least one of the service processor and the operating system announcing the state of the operating system.

15. A computing system, comprising:
   a central processor;
   an operating system under the control of the central processor; and
   a service processor communicatively coupled to the central processor via a communication channel, and in communication with the operating system,
   wherein the service processor is configured to externally communicate a state of the operating system independent of the central processor, by:
   establishing a communication channel between a service processor and a central processor in a computing system, wherein communication on the communication channel is independent of processing by the central processor;
   monitoring an operating system, having state information, the operating system being executed by the central processor;
   defining a source designator that is passed via the communication channel between the service processor and the central processor, the communication channeling enabling the service processor to announce a state of the operating system when the central processor is unable to announce the state of the operating system; and
   announcing the state information to a resource external to the computing system.

16. The system and as claimed in claim 15 wherein the communication channel is established via at least one of registers in the computing system, storage in the computing system, and stack frames in the computing system.

17. The system as claimed in claim 15 wherein the service processor externally communicates the state of the operating system through at least one of a broadcast and a direct signal to an external designated systems management system.

18. The system as claimed in claim 15 wherein the operating system communicates the state information externally via the service processor.

19. The system as claimed in claim 18 wherein the state information is communicated by the service processor as if the information is communicated by the operating system.

20. The system as claimed in claim 15 wherein the state information includes at least one of a current operational state of the operating system, an anticipated next state of the operating system, estimated time to a next state of the operating system, a source designator for an announcement of the state information, a confidence of the state information, a confidence of the next state of the operating system and a confidence of the estimated time to the next state of the operating system, wherein the source designator designates at least one of the service processor and the operating system announcing the state of the operating system.

* * * * *